(12) United States Patent
Osaka

(10) Patent No.: US 7,252,384 B2
(45) Date of Patent: Aug. 7, 2007

(54) THREE-PANEL PROJECTION DISPLAY APPARATUS FOR DISPLAYING COLOR IMAGES

(75) Inventor: Akihiro Osaka, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 241 days.

(21) Appl. No.: 11/139,656

(22) Filed: May 31, 2005

(65) Prior Publication Data

US 2005/0264763 A1 Dec. 1, 2005

(30) Foreign Application Priority Data

Jun. 1, 2004 (JP) ............................. 2004-163169

(51) Int. Cl.
*G03B 21/00* (2006.01)
*G03B 21/14* (2006.01)
*G03B 21/20* (2006.01)

(52) U.S. Cl. ............................ 353/31; 353/33; 353/38; 353/102

(58) Field of Classification Search .................. 353/31, 353/33, 38, 102; 349/5, 7, 8
See application file for complete search history.

(56) References Cited

U.S. PATENT DOCUMENTS 6,260,972 B1 * 7/2001 Robinson et al. ............. 353/38

2004/0080938 A1 * 4/2004 Holman et al. ............. 362/231

FOREIGN PATENT DOCUMENTS

JP 10-115799 5/1998

* cited by examiner

*Primary Examiner*—Melissa Jan Koval
(74) *Attorney, Agent, or Firm*—McGinn IP Law Group, PLLC

(57) ABSTRACT

A three-panel projection display apparatus displays a color image by separating light emitted from a light source into lights of three primaries, i.e., red, green, and blue, with dichroic mirrors, by irradiating liquid crystal light valves with the respective separated lights, by combining the lights modulated by the respective liquid crystal light valves with a cross dichroic prism, and by projecting the combined light through a single projection lens onto a screen. The lengths of the light paths for the separated blue and green lights are equal to each other. The distance between a condenser lens and the liquid crystal light valve in the blue light path is shorter than the distance between a condenser lens and the liquid crystal light valve in the green light path.

2 Claims, 7 Drawing Sheets a = b

THREE-PANEL PROJECTION DISPLAY APPARATUS FOR DISPLAYING COLOR IMAGES

BACKGROUND OF THE INVENTION

1. Field of the Invention

The present invention relates to a three-panel projection display apparatus, and more particularly to a projection display apparatus for displaying a color image by separating light emitted from a light source into lights of three primaries, i.e., red, green, and blue, with color separating optical systems, by irradiating three modulating means with the separated lights, by combining the lights modulated by the respective modulating means with a color combining optical system, and by projecting the combined light through a single projection lens onto a screen.

2. Description of the Related Art

The optical systems of three-panel projection display apparatus, as they are applied to liquid crystal projectors, will be described below.

FIG. 1 of the accompanying drawings shows a conventional liquid crystal projector for projecting a color image onto a screen. As shown in FIG. 1, light emitted from light source 1 is reflected by reflecting mirror 2 and directed, as illuminating light having a uniform luminance distribution through two integra-tor lenses 4, 5 and first collective lens 7, toward a liquid crystal light valve that serves as a modulating means. Before the light is applied to first collective lens 7, it is converted into S-polarized light by polarization converter 6 according to polarization separation and polarization conversion.

White light that has passed through first collective lens 7 is separated into blue light B and green red light G-R by dichroic mirror 8 that serves as a first color separating optical system for reflecting blue light and passing red and green lights. The green red light G·R that has passed through dichroic mirror 8 is separated into green light G and red light R by second dichroic mirror 9 that serves as a second color separating optical system for reflecting green and blue lights and transmitting red light.

The blue right B separated by dichroic mirror 8 is reflected by reflecting mirror 10 and passes through condenser lens 13A to liquid crystal light valve 15A. The green light G separated by dichroic mirror 9 passes through condenser lens 13B to liquid crystal light valve 15B. The red light R separated by dichroic mirror 9 is applied to liquid crystal light valve 15C by a relay optical system comprising two relay lenses 17, 18 and two reflecting lenses 11, 12, and condenser lens 13.

Liquid crystal valves 15A, 15B, 15C, which correspond to the blue, green, and red lights, respectively, are combined with polarizing panels 14A, 14B, 14C that are positioned on the entrance sides of liquid crystal valves 15A, 15B, 15C, respectively, and polarizing panels 16A, 16B, 16C that are positioned on the exit sides of liquid crystal valves 15A, 15B, 15C, respectively. These polarizing plates serve to align the planes of polarization of the polarized lights that are modulated by the liquid crystal valves. The polarizing panels on the entrance sides and the polarizing panels on the exit sides are angularly arranged such that their transmission axes extend perpendicularly to each other. Only lights that are polarized in a direction parallel to the transmission axis of the polarizing panels on the exit sides pass through the polarizing panels on the exit sides, and lights that are polarized in other directions are absorbed by the polarizing panels on the exit sides. The lights that are applied to liquid crystal valves 15A, 15B, 15C are modulated thereby, and the modulated lights are combined with each other by cross dichroic prism 19 that serves as a color combining optical system. The combined light is then projected at an enlarged scale onto projection screen 21 by projection lens 20.

Condenser lenses 13A, 13B that are disposed respectively in blue and green light paths, which are of the same length, are identical to each other. Distance b between condenser lens 13A in the blue light path and liquid crystal light valve 15A is the same as distance a between condenser lens 13B in the green light path and liquid crystal light valve 15B.

FIG. 2 of the accompanying drawings shows another conventional liquid crystal projector having an optical system wherein second collective lens 31A is disposed in the blue light path between dichroic mirror 8 and reflecting mirror 10 and second collective lens 31B is disposed in the green light path between two dichroic mirrors 8, 9. Second collective lenses 31A, 31B that are disposed respectively in the blue and green light paths, which are of the same length, are identical to each other. Second collective lenses 31A, 31B are positioned at the same distance respectively from liquid crystal light valves 15A, 15B in the respective light paths. Specifically, the light path length (e+f) from liquid crystal light valve 15A via reflecting mirror 10 to second collective lens 31A in the blue light path is the same as the light path length (c+d) from liquid crystal light valve 15B via dichroic mirror 9 to second collective lens 31B in the green light path.

In the liquid crystal projectors described above, the effective pixel regions of the liquid crystal light valves are uniformly illuminated by an integrator illuminating system that comprises two integrator lenses (fly-eye lenses) 4, 5 and collective lens 7. There is also known a projection display apparatus incorporating a rod lens illuminating system, rather than an integrator illuminating system, which comprises a rod lens and two collective lenses for illuminating liquid crystal light valves with lights having a uniform luminance distribution.

With the cross dichroic prism being used as described above, only one of the distances (light path lengths) from the collective lenses to the liquid crystal light valves in the respective light paths is longer than the other distances. In the liquid crystal projectors shown in FIGS. 1 and 2, the distances from the collective lenses to the liquid crystal light valves in the blue and green light paths are the same as each other, but the distance from the collective lens to the liquid crystal light valve in the red light path is longer than the corresponding distances in the blue and green light paths. Therefore, the amount of light applied to the liquid crystal light valve in the red light path is smaller than the amounts of light applied to the liquid crystal light valves in the blue and green light paths. The relay optical system that include relay lenses 17, 18 is disposed in the red light path for the purpose of uniformizing the amounts of light applied to the respective liquid crystal light valves in the red, blue, and green light paths. The type of the projection display apparatus which employs the relay optical system in the red light path is referred to as a red relay type, and the three-panel liquid crystal projectors shown in FIGS. 1 and 2 are of the red relay type.

If dichroic mirror 8 shown in FIGS. 1 and 2 is replaced with a component for reflecting red light and passing green and blue lights and dichroic mirror 9 is replaced with a component for reflecting green and red lights and transmitting blue light, then the distance from the collective lens to the liquid crystal light valve in the blue light path is longer than the distances from the collective lenses to the liquid crystal light valves in the red and green light paths. In this arrangement, the relay optical system is employed in the blue light path, and this type is referred to as a blue relay type.

In the projection display apparatus such as the liquid crystal projectors described above, the liquid crystal light valves have respective image forming areas smaller than the areas thereof that are illuminated by the light emitted from the light source. The image forming areas that are smaller than the illuminated areas are prevented from protruding out of the illuminated areas even if the illuminated areas are vertically or horizontally shifted due to errors with respect to the positioning accuracy and focal lengths of the integrator lenses. Such an area setting allows the image forming areas of the liquid crystal light valves to be accurately illuminated by the light emitted from the light source.

However, if the illuminated areas are too large compared with the image forming areas, then the image projected onto the projection screen will not have sufficient brightness. If the illuminated areas are of the same size as the image forming areas, then when the components of the integrator illuminating system suffer an error, the illuminated area tends to be shifted out of alignment with the image forming areas, possibly producing a shaded region on an edge of the projected image.

One solution to the above problems is provided by a process disclosed in Japanese laid-open patent publication No. 115799/1998.

According to the process disclosed in Japanese laid-open patent publication No. 115799/1998, the positions of integrator lenses, the position of the first collective lens, and the angles of the reflecting mirrors can be fine-adjusted for adjusting the illuminated areas in the respective light paths out of misalignment. The disclosed process makes it unnecessary to set wide margins around the image forming areas of the light crystal light valves in view of possible displacements of the illuminated areas. As any margins to be set around the image forming areas may be very small, the illuminating light can be utilized efficiently and the brightness of projected images is increased. Even though the margins around the image forming areas are small, since the positions of integrator lenses, the position of the first collective lens, and the angles of the reflecting mirrors can be fine-adjusted, the image forming areas will not protrude partly out of the illuminated areas and no shaded region will be formed on an edge of the projected image.

According to the process disclosed in Japanese laid-open patent publication No. 115799/1998, however, the illuminated areas in the respective light paths are adjusted out of misalignment simply by fine-adjusting the positions of integrator lenses, the position of the first collective lens, and the angles of the reflecting mirrors. Even if the process disclosed in Japanese laid-open patent publication No. 115799/1998 is applied to the red relay type shown in FIGS. 1 and 2 where the distance from the collective lens to the liquid crystal light valve in the red light path is longer than the corresponding distances in the blue and green light paths, the illuminated area in the blue light path is not clearly defined and is smaller than the illuminated area in the green light path. If the liquid crystal projector is designed in accordance with the illuminated area in the blue light path, then the illuminated area in the green light path will become larger than necessary, resulting in a reduction in the brightness of the projected image.

The reasons for the above problem are as follows: As regards the red relay type shown in FIGS. 1 and 2, since the refractive indexes of glass materials of the polarizing plates with respect to the wavelengths of lights used differ widely from each other in the green and blue light paths whose light path lengths up to the light valves are equal to each other, even if the illuminated area in the green light path have sharply defined edges, the illuminated area in the blue light path is blurred due to a different axial chromatic aberration, resulting in a reduced effective illuminated area.

Regarding the blue relay type, since the refractive indexes of glass materials of the polarizing plates with respect to the wavelengths of lights used are close to each other in the red and green light paths whose light path lengths up to the light valves are equal to each other, there is no large difference between the distributions of the amounts of light on the illuminated areas in the red and green light paths. A relay optical system having different light path lengths is free from the problems of the red relay type because it is possible to increase or to reduce design values of the illuminated areas based on the layout of lenses, and also to reduce aberrations.

SUMMARY OF THE INVENTION

It is an object of the present invention to provide a three-panel projection display apparatus of the red relay type which is capable of forming an illuminated area in a blur-free rectangular shape in a blue light path without the need for making an illuminated area in a green light path larger than necessary with respect to an image forming area.

According to the present invention, there is provided a threepanel projection display apparatus for displaying a color image by separating light emitted from a light source into lights of three primaries, i.e., red, green, and blue, with color separating optical systems, by irradiating three modulating means with the separated lights, by combining the lights modulated by the respective modulating means with a color combining optical system, and by projecting the combined light through a single projection lens onto a screen, the lengths of light paths for the separated blue and green lights being equal to each other.

The three-panel projection display apparatus has lenses disposed respectively in the blue and green light paths for forming illuminated areas on the respective modulating means, and the distance from the lens to the modulating means in the blue light path is shorter than the distance from the lens to the modulating means in the green light path.

Alternatively, the three-panel projection display apparatus has lenses disposed respectively in the blue and green light paths for forming illuminated areas on the respective modulating means, and the distance from the lens to the modulating means in the blue light path is equal to the distance from the lens to the modulating means in the green light path, with the lens in the blue light path having a radius of curvature larger than the lens in the green light path.

With the above arrangement, since the refractive indexes of glass materials with respect to the wavelengths of lights used widely differ from each other in the green and blue light paths, of the three light paths, i.e., the blue, green, and red light paths, from the color separating optical systems to the corresponding modulating means, widely different chromatic aberrations are developed, resulting in different focused positions with respect to the modulating means. However, such a focused position difference can be corrected by placing the lenses in different positions in the green and blue light paths. An illuminated area on the modulating means in the green light path can be set to a minimum size with respect to the effective area (image forming area) of the modulating means in the green light path, and an illuminated area on the modulating means in the blue light path can be illuminated in a blur-free shape.

The above and other objects, features, and advantages of the present invention will become apparent from the following description with reference to the accompanying drawings which illustrate examples of the present invention.

DESCRIPTION OF THE PREFERRED EMBODIMENTS

Liquid crystal projectors having three panels in the form of liquid crystal light valves will be described below as a three-panel projection display apparatus of the red relay type according to various embodiments of the present invention. However, the principles of the present invention are not limited to the illustrated liquid crystal projectors, but are also applicable to projection display apparatuses employing micromirror devices.

Figure 1:
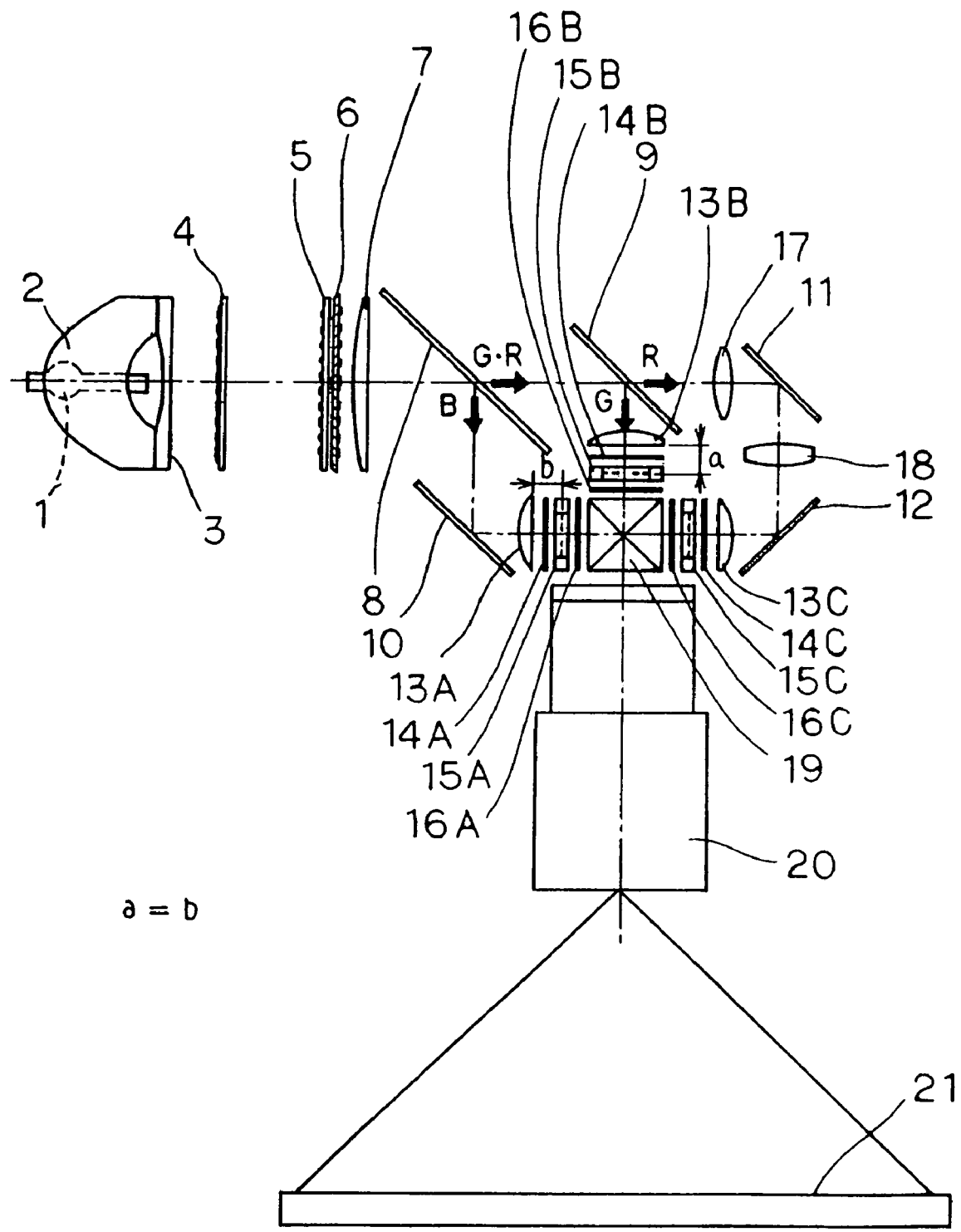
FIG. 1 is a schematic view of a conventional three-panel projection display apparatus of the red relay type.
Figure 2:
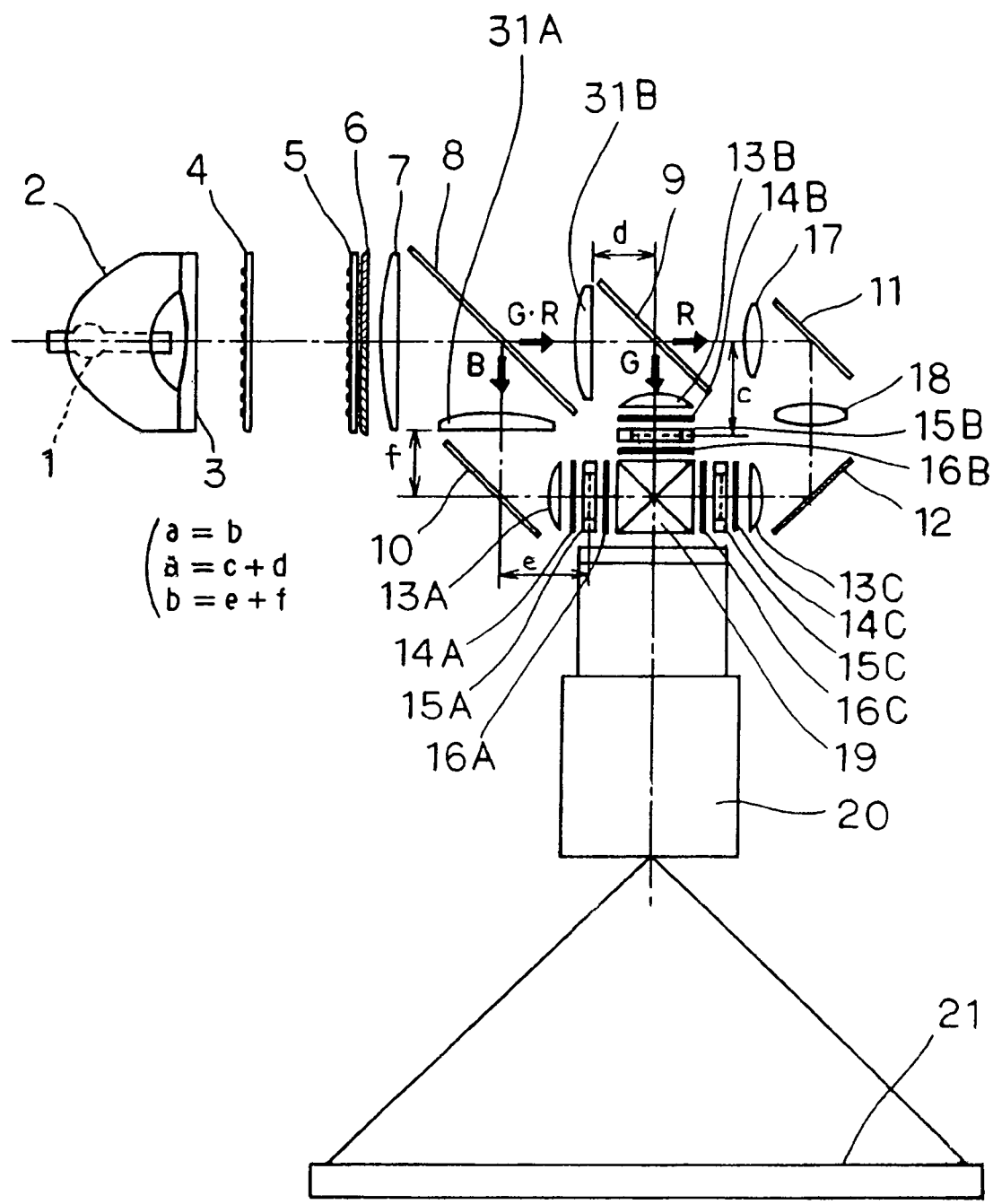
FIG. 2 is a schematic view of another conventional three-panel projection display apparatus of the red relay type.

Those parts shown in FIGS. 3 through 7 which are identical to those of the three-panel projection display apparatus shown in FIGS. 1 and 2 are denoted by identical reference characters. Features of the three-panel projection display apparatus shown in FIGS. 3 through 7 which are different from the three-panel projection display apparatus shown in FIGS. 1 and 2 will mainly be described below.

A three-panel projection display apparatus of the red relay type according to a first embodiment of the present invention will be described below with reference to FIG. 3.

Figure 3:
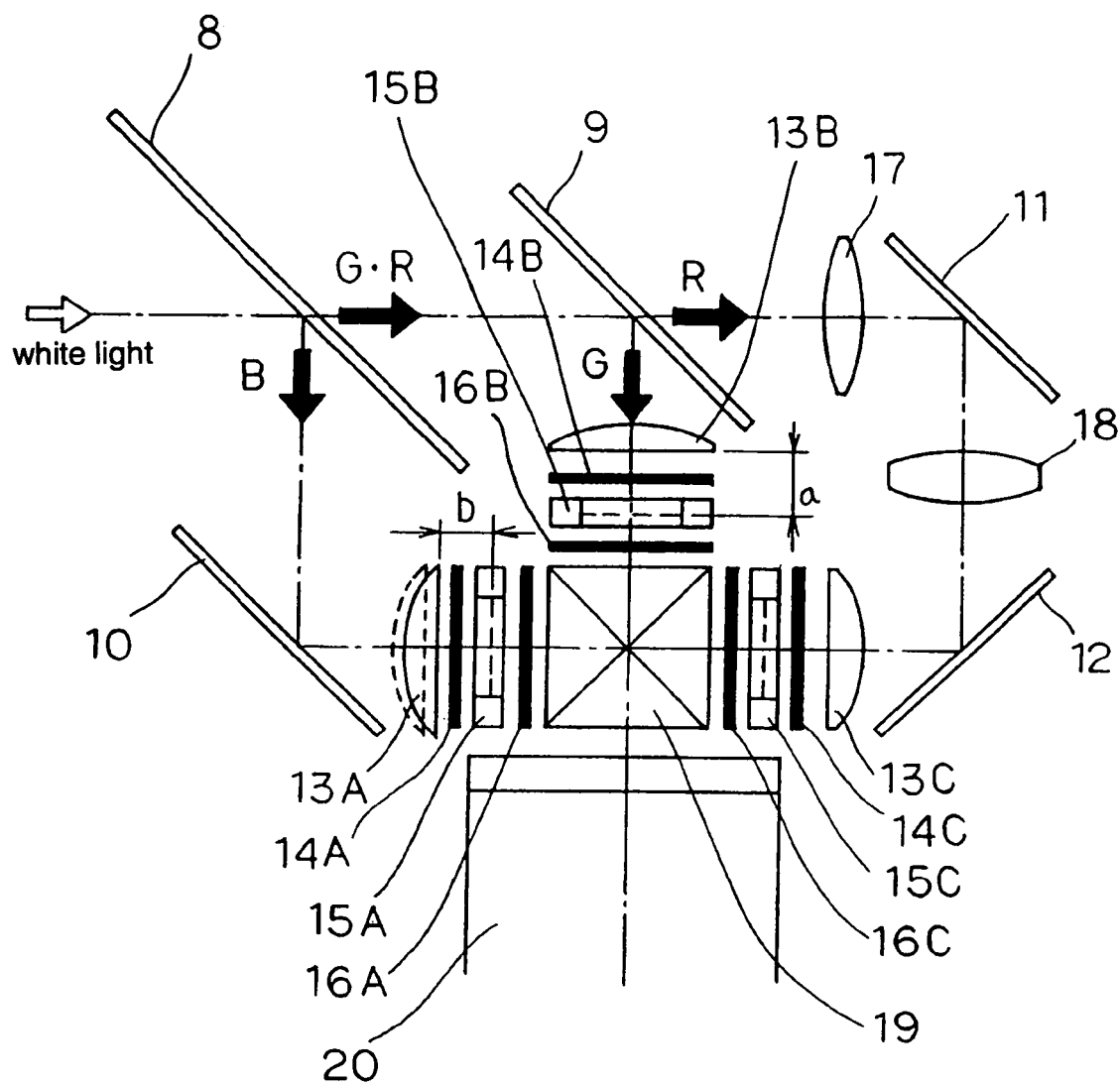
FIG. 3 is a schematic view showing a central portion of a three-panel projection display apparatus of the red relay type according to a first embodiment of the present invention.

As shown in FIG. 3, the distance between condenser lens 13B and liquid crystal light valve 15B in the green light path is represented by "a", and the distance between condenser lens 13A and liquid crystal light valve 15A in the blue light path is represented by "b". These distances "a", "b" satisfy the following formula:

$$a \text{ [mm]} \geq b \text{ [mm]} + 2 \text{ [mm]}$$

That is, the distance "b" is 2 mm or more shorter than the distance "a".

By optimally designing an illuminated area on liquid crystal light valve 15B thus positioned, the illuminated area in the green light path is not made larger than necessary, and the illuminated area in the blue light path is illuminated in a blur-free rectangular shape in the blue light path.

A three-panel projection display apparatus of the red relay type according to a second embodiment of the present invention will be described below with reference to FIG. 4.

Figure 4:
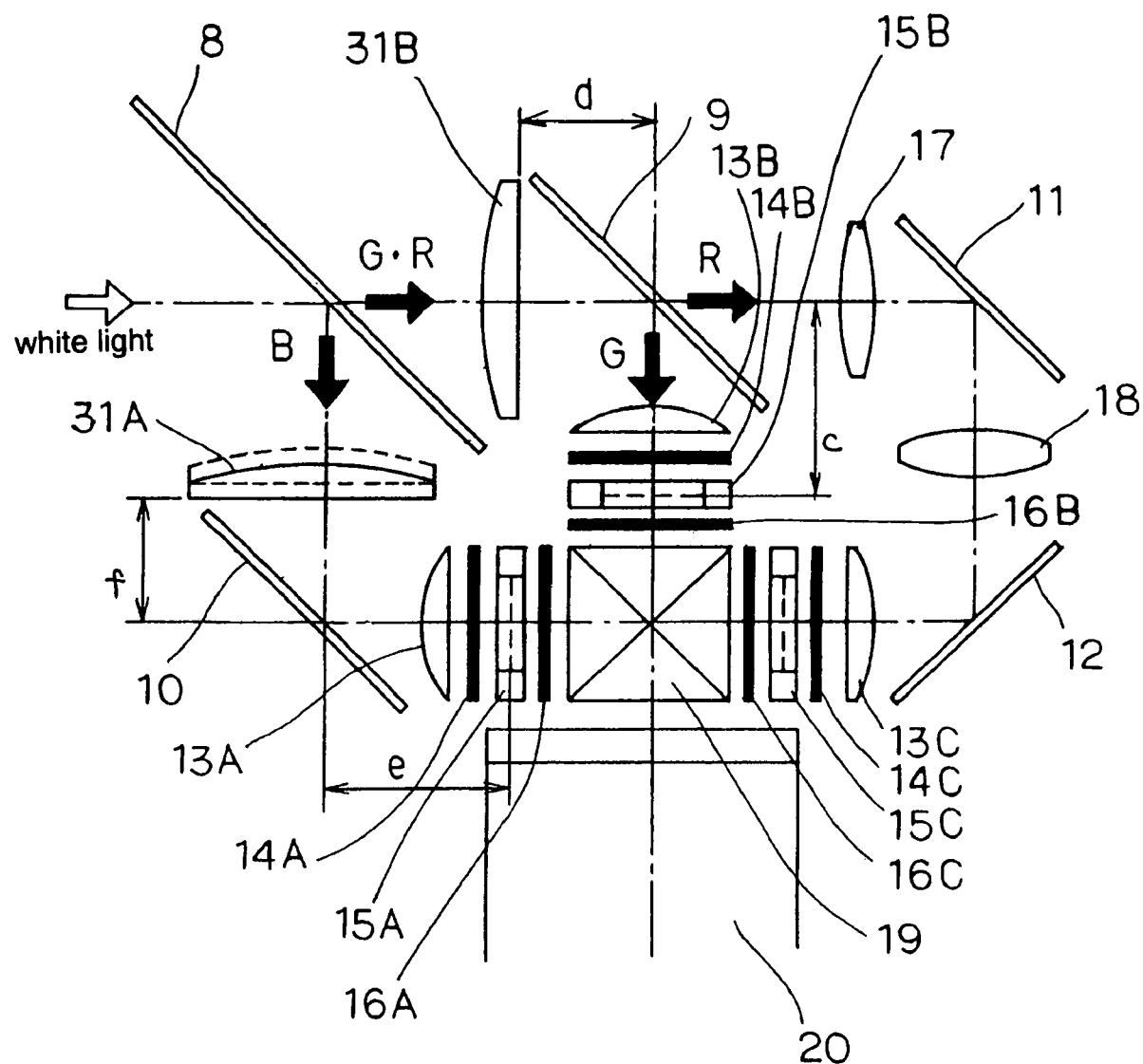
FIG. 4 is a schematic view showing a central portion of a three-panel projection display apparatus of the red relay type according to a second embodiment of the present invention.

As shown in FIG. 4, the three-panel projection display apparatus of the red relay type according to the second embodiment has an optical system similar to the optical system of the three-panel projection display apparatus of the red relay type according to the first embodiment; except that second collective lens 31A is disposed between dichroic mirror 8 and reflecting mirror 10 and second collective lens 31B is disposed between dichroic mirrors 8, 9.

The distance from liquid crystal light valve 15B via dichroic mirror 9 to second collective lens 31B in the green light path is represented by "c+d", and the distance from liquid crystal light valve 15A via reflecting mirror 10 to second collective lens 31A in the blue light path is represented by "e+f". These distances "c+d", "e+f" satisfy the following formula:

$$(c+d) \text{ [mm]} \geq (e+f) \text{ [mm]} + 2 \text{ [mm]}$$

That is, the distance "e+f" is 2 mm or more shorter than the distance "c+d". The three-panel projection display apparatus of the red relay type according to the second embodiment offers the same advantages as the three-panel projection display apparatus of the red relay type according to the first embodiment.

Figure 5:
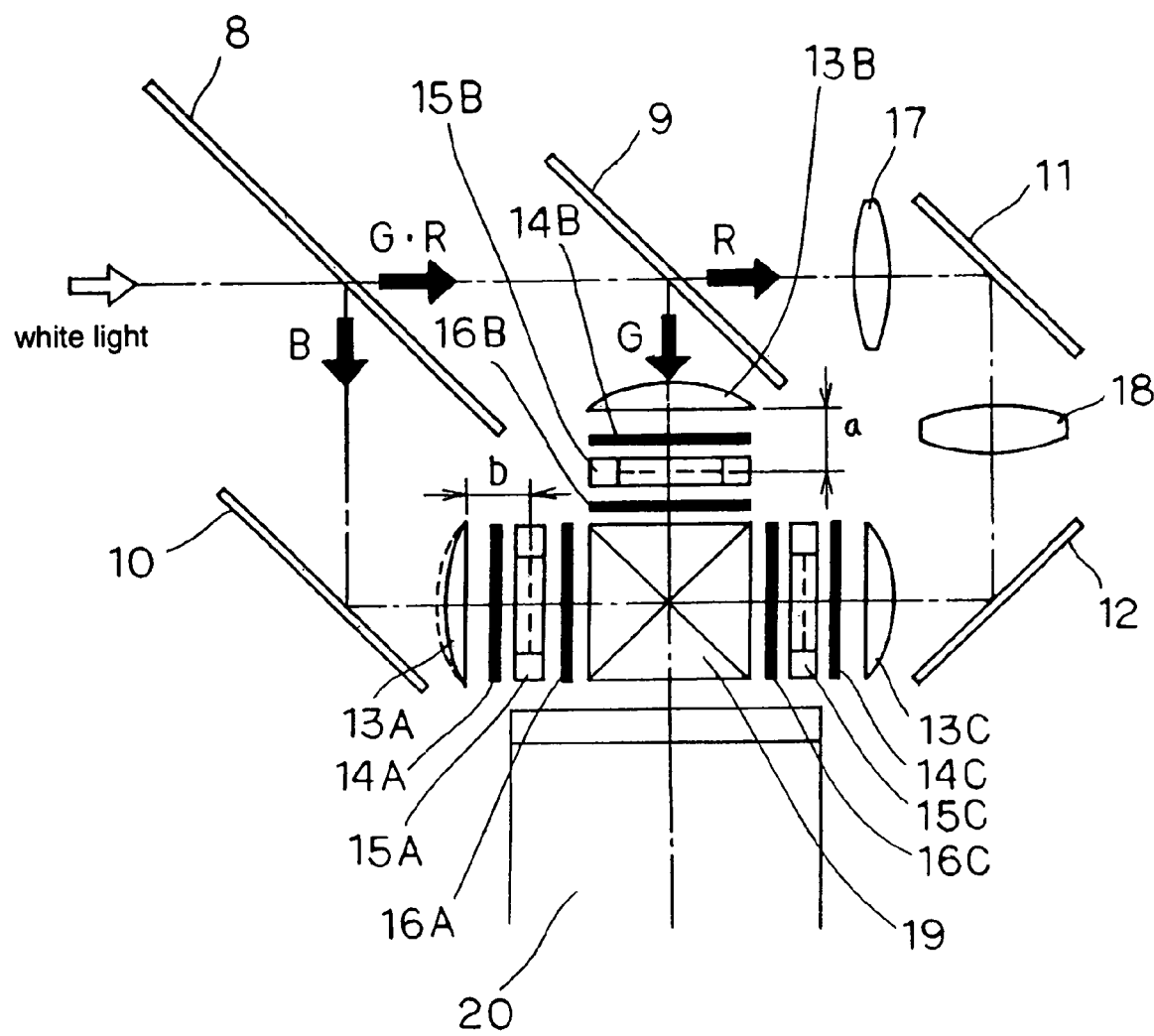
FIG. 5 is a schematic view showing a central portion of a three-panel projection display apparatus of the red relay type according to a third embodiment of the present invention.

A three-panel projection display apparatus of the red relay type according to a third embodiment of the present invention will be described below with reference to FIG. 5.

The three-panel projection display apparatus of the red relay type according to the third embodiment is a modification of the three-panel projection display apparatus of the red relay type according to the first embodiment. As shown in FIG. 5, the distance between condenser lens 13B and liquid crystal light valve 15B in the green light path is represented by "a", and the distance between condenser lens 13A and liquid crystal light valve 15A in the blue light path is represented by "b". These distances "a", "b" satisfy the following formula:

$$a \text{ [mm]} \approx b \text{ [mm]}$$

In addition, the radius of curvature of condenser lens 13A in the blue light path is larger than the radius of curvature of condenser lens 13B in the green light path. For example, if the condenser lenses are made of BK7, then the radius, represented by "Rb", of curvature of condenser lens 13B in the green light path, and the radius, represented by "Ra" of curvature of condenser lens 13A in the blue light path, satisfy the following formula:

$$1.4Rb \text{ [mm]} \geq Ra \text{ [mm]} \geq 1.2Rb \text{ [mm]}$$

The three-panel projection display apparatus of the red relay type according to the third embodiment offers the same advantages as the three-panel projection display apparatus of the red relay type according to the first embodiment.

The positions of the light valves will be described below.

Focused positions of the projection lens for the respective light paths differ from each other because the projection lens has different axial chromatic aberrations for R, G, B lights and the polarizing plates on the exit sides in the respective light paths are made of different glass substrate materials and have different thicknesses. Therefore, the distances "a", "b"

are not strictly made equal to each other. In the three-panel projection display apparatus, the projection lens has an axial chromatic aberration up to 0.15 mm. The glass substrate materials of the polarizing plates on the exit sides range from a glass material having a refractive index of about 1.5, such as white sheet glass or blue sheet glass, to a glass material having a refractive index of about 1.8, such as sintered ceramic glass, and the glass substrates of the polarizing plates on the exit sides range from 2 mm to about 0.5 mm. In view of the glass substrate materials and thicknesses, the positions of the light valves in the respective light paths differ by about 0.75 mm. Putting the above two factors together, if the positions of the light valves in the respective light paths differ by 0.9 mm or less, then their positions may be regarded as being substantially the same as each other. The distances "a", "b" which satisfy the following formula:

$$|a \text{ [mm]} - b \text{ [mm]}| \leq 0.9 \text{ [mm]}$$

are regarded as satisfying the following formula:

$$a \text{ [mm]} \approx b \text{ [mm]}$$

A three-panel projection display apparatus of the red relay type according to a fourth embodiment of the present invention will be described below with reference to FIG. 6.

Figure 6:
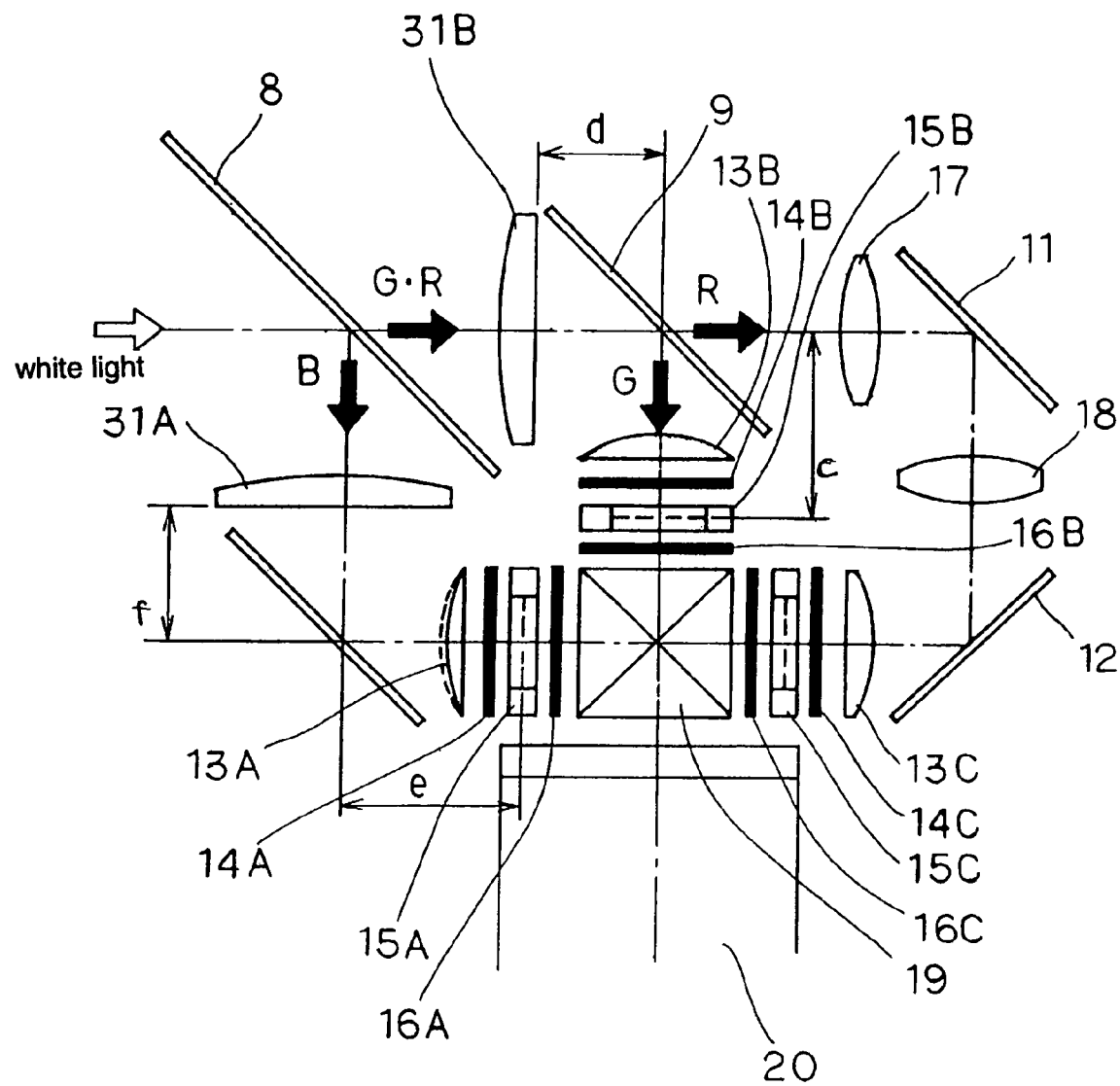
FIG. 6 is a schematic view showing a central portion of a three-panel projection display apparatus of the red relay type according to a fourth embodiment of the present invention.

As shown in FIG. 6, the three-panel projection display apparatus of the red relay type according to the fourth embodiment includes second collective lens 31A and second collective lens 31B as with the three-panel projection display apparatus of the red relay type according to the second embodiment. According to the fourth embodiment, furthermore, the distance from liquid crystal light valve 15B via dichroic mirror 9 to second collective lens 31B in the green light path is represented by "a" (=c+d), and the distance from liquid crystal light valve 15A via reflecting mirror 10 to second collective lens 31A in the blue light path by is represented by "b" (=e+f). These distances "a", "b" satisfy the following formula:

$$a \text{ [mm]} \approx b \text{ [mm]}$$

In addition, the radius of curvature of condenser lens 13A in the blue light path is larger than the radius of curvature of condenser lens 13B in the green light path. For example, if the condenser lenses are made of BK7, then the radius, represented by "Rb", of curvature of condenser lens 13B in the green light path, and the radius, represented by "Ra" of curvature of condenser lens 13A in the blue light path, satisfy the following formula:

$$1.4Rb \text{ [mm]} \geq Ra \text{ [mm]} \geq 1.2Rb \text{ [mm]}$$

The three-panel projection display apparatus of the red relay type according to the fourth embodiment offers the same advantages as the three-panel projection display apparatus of the red relay type according to the first embodiment.

Figure 7:
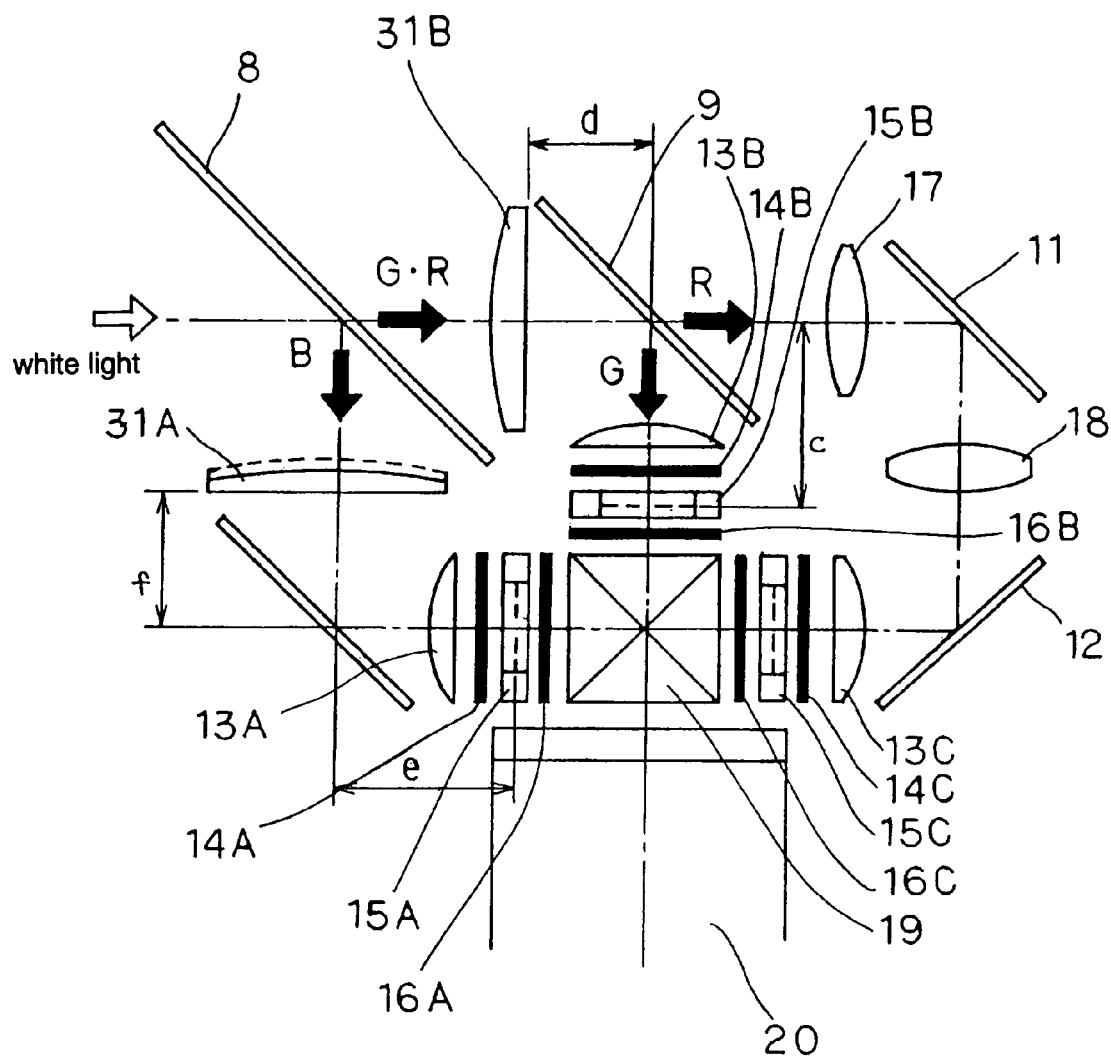
FIG. 7 is a schematic view showing a central portion of a modification of the three-panel projection display apparatus of the red relay type according to a fourth embodiment of the present invention.

In the modification of the three-panel projection display apparatus of the red relay type according to the fourth embodiment, as shown in FIG. 7, the radiuses of curvature of condenser lenses 13A, 13B are equal to each other, and the radius of curvature of second collective lens 31A in the blue light path may be larger than the radius of curvature of second collective lens 31B in the green light path.

If the radius of curvature of second collective lens 31B in the green light path is represented by "Rb2" and the radius of curvature of second collective lens 31A in the blue light path is represented by "Ra2", then these radiuses of curvature satisfy the following formula:

$$1.3Rb2 \text{ [mm]} \geq Ra2 \text{ [mm]} \geq 1.1Rb2 \text{ [mm]}$$

The modification of the three-panel projection display apparatus of the red relay type according to the fourth embodiment offers the same advantages as the three-panel projection display apparatus of the red relay type according to the first embodiment.

With a projection display apparatus (not shown) which employs a TIR (Total Internal Reflection) prism instead of cross dichroic prism 19, the three light paths, i.e., the blue, green, and red light paths, have the same light path length. In such a projection display apparatus, the condenser lenses in the blue and green light paths are positioned in the same manner as in with the first and third embodiments, providing the same advantages as the three-panel projection display apparatus of the red relay type according to the first embodiment.

While preferred embodiments of the present invention have been described using specific terms, such description is for illustrative purposes only, and it is to be understood that changes and variations may be made without departing from the spirit or scope of the following claims.

What is claimed is:

1. A projection display apparatus comprising:
   a light source for emitting white light;
   a first color separating optical system for reflecting blue light and passing green light and red light from the white light emitted from said light source;
   a second color separating optical system for reflecting the green light and passing the red light from the green light and the red light which have passed through said first color separating optical system;
   first modulating means for modulating the blue light reflected by said first color separating optical system;
   second modulating means for modulating the green light reflected by said second color separating optical system;
   third modulating means for modulating the red light having passed through said second color separating optical system;
   a color combining optical system for combining the blue light, the green light, and the red light which have been modulated by said first modulating means, said second modulating means, and said third modulating means, respectively;
   a first lens disposed in a blue light path between said first color separating optical system and said first modulating means; and
   a second lens disposed in a green light path between said second color separating optical system and said second modulating means;
   wherein a length of the blue light path from said first color separating optical system to said first modulating means is equal to the length of the green light path from said second color separating optical system to said second modulating means;
   wherein a distance between said first lens and said first modulating means in the blue light path is shorter than the distance between said second lens and said second modulating means in the green light path.

2. A projection display apparatus comprising:
   a light source for emitting white light;
   a first color separating optical system for reflecting blue light and passing green light and red light from the white light emitted from said light source;
   a second color separating optical system for reflecting the green light and passing the red light from the green light and the red light which have passed through said first color separating optical system;

first modulating means for modulating the blue light reflected by said first color separating optical system;

second modulating means for modulating the green light reflected by said second color separating optical system;

third modulating means for modulating the red light having passed through said second color separating optical system;

a color combining optical system for combining the blue light, the green light, and the red light which have been modulated by said first modulating means, said second modulating means, and said third modulating means, respectively;

a first lens disposed in a blue light path between said first color separating optical system and said first modulating means; and a second lens disposed in a green light path between said second color separating optical system and said second modulating means;

wherein a length of the blue light path from said first color separating optical system to said first modulating means is equal to the length of the green light path from said second color separating optical system to said second modulating means;

wherein a distance between said first lens and said first modulating means in the blue light path is equal to the distance between said second lens and said second modulating means in the green light path, and the radius of curvature of said first lens in the blue light path is larger than the radius of curvature of said second lens in the green light path.

* * * * *